US007012948B2

(12) United States Patent
Kim et al.

(10) Patent No.: US 7,012,948 B2
(45) Date of Patent: Mar. 14, 2006

(54) METHOD FOR ASSIGNING CODES IN UPLINK OF SYNCHRONOUS WIRELESS TELECOMMUNICATION SYSTEM

(75) Inventors: Duk-Kyung Kim, Seoul (KR); Yoon-Seok Jung, Kyounggi-do (KR); Sang-Yun Lee, Kyounggi-do (KR); Jin-Young Kim, Seoul (KR)

(73) Assignee: SK Telecom Co., Ltd., (KR)

( * ) Notice: Subject to any disclaimer, the term of this patent is extended or adjusted under 35 U.S.C. 154(b) by 964 days.

(21) Appl. No.: 09/898,954

(22) Filed: Jul. 3, 2001

(65) Prior Publication Data

US 2002/0003786 A1    Jan. 10, 2002

(30) Foreign Application Priority Data

Jul. 4, 2000    (KR) ................. 2000-38046

(51) Int. Cl.
- *H04B 1/69*    (2006.01)
- *H04B 1/707*   (2006.01)
- *H04B 1/713*   (2006.01)

(52) U.S. Cl. .............. 375/130; 375/260; 375/367; 327/164

(58) Field of Classification Search ........... 370/210, 370/276, 335; 375/219, 365, 366, 367, 130; 455/73; 710/1
See application file for complete search history.

(56) References Cited

U.S. PATENT DOCUMENTS 5,689,526 A * 11/1997 Slonneger et al. .......... 375/145
6,157,619 A * 12/2000 Ozluturk et al. ........... 370/252
6,215,778 B1 * 4/2001 Lomp et al. ................ 370/335
6,263,013 B1 * 7/2001 Hendrickson ............... 375/150
6,289,039 B1 * 9/2001 Garodnick .................. 375/143
6,603,735 B1 * 8/2003 Park et al. .................. 370/208
6,680,902 B1 * 1/2004 Hudson ...................... 370/210
6,731,673 B1 * 5/2004 Kotov et al. ................ 375/145

OTHER PUBLICATIONS

"Uplink Synchronous Transmission Scheme (USTS)", Jul. 4, 2000, XP002185297, 5 pages.
Universal Mobile Telecommunications System (UMTS) Spreading and Modulation (FDD); Mar. 2000, pp. 1-27, XP-002203809.
"Uplink Synchronization Transmission Scheme" TSG-Ran Working Group, Aug. 30, 1999 - Sep. 3, 1999, 2 pages.

* cited by examiner

*Primary Examiner*—Stephen Chin
*Assistant Examiner*—Erin M. File
(74) *Attorney, Agent, or Firm*—Blakely Sokoloff Taylor & Zafman

(57) ABSTRACT

A method for assigning codes in an uplink of a synchronous code division multiple access (CDMA) telecommunication system is disclosed. The method for assigning a code in a reverse channel of a synchronous wireless telecommunication system, comprising the steps of: a) at a mobile station, receiving time matching information of a scrambling code from a base station; b) at the mobile station, spreading data frame to be transmitted by an orthogonal code, thereby generating a spread data; and c) at the mobile station, multiplying the spread data by a scrambling code based on the time matching information of the scrambling code, thereby generating an encoded data.

6 Claims, 3 Drawing Sheets

METHOD FOR ASSIGNING CODES IN UPLINK OF SYNCHRONOUS WIRELESS TELECOMMUNICATION SYSTEM

FIELD OF THE INVENTION

The present invention relates to a method for assigning codes in an uplink of a synchronous code division multiple access (CDMA) telecommunication system; and, more particularly, to a method for assigning codes in an uplink of a synchronous CDMA telecommunication system in which a signal to be transmitted is spread by an orthogonal code and then multiplied by a scrambling code based on a synchronization control message from a base station.

DESCRIPTION OF THE PRIOR ART

A traffic channel between a base station and a mobile station in a conventional code division multiple access (CDMA) system includes a forward channel (downlink) and a reverse channel (uplink). At this time, multiple forward channels between the base station and multiple mobile stations located within coverage (cell) of one base station are synchronized with each other based on timing information. Therefore, when demodulating signals, interference between the channels can be considerably reduced by using orthogonal codes that are orthogonal from each other.

However, in the reverse channel, since the timing information is not used, the reverse channels cannot be synchronized. As the number of the reverse channels is increased, the interference in the reverse channel is increased. Therefore, capacity of the reverse channel is limited.

To increase the capacity of the reverse channel, it is necessary for multiple reverse channels to be synchronized by using the same timing information. The reverse channels are synchronized, and then, the interference between the reverse channels can be minimized by identifying the channels based on the orthogonal codes each having orthogonality. This method is referred to as "an uplink synchronous transmission scheme (USTS)".

One of core technologies necessary for the USTS is a code assignment, which has not been developed.

SUMMARY OF THE INVENTION

Therefore, it is an object of the present invention to provide a method for assigning codes so as to synchronize reverse channels in an uplink of a synchronous CDMA telecommunication system.

In accordance with an aspect of the present invention, there is provided a method for assigning codes in a reverse channel of a synchronous wireless telecommunication system, comprising the steps of: a) at a mobile station, receiving time matching information of a scrambling code from a base station; b) at the mobile station, spreading data frame to be transmitted by an orthogonal code, thereby generating a spread data; and c) at the mobile station, multiplying the spread data by a scrambling code based on the time matching information of the scrambling code, thereby generating an encoded data.

In accordance with another aspect of the present invention, there is provided a method for assigning a code in a reverse channel of a synchronous wireless telecommunication system, comprising the steps of: a) at a base station, transmitting time matching information of a scrambling code to a mobile station; b) at a base station, receiving an encoded data which is scrambled based on the time matching information from the mobile station; and c) decoding the encoded data by despreading and descrambling the encoded data.

In accordance with further another aspect of the present invention, there is provided a computer readable recording medium in a mobile station having a processor, which stores instructions for executing a method for assigning a code in a reverse channel of a synchronous wireless telecommunication system, the method comprising the steps of: a) at a mobile station, receiving time matching information of a scrambling code from a base station; b) at the mobile station, spreading data frame to be transmitted by an orthogonal code, thereby generating a spread data; and c) at the mobile station, multiplying the spread data by a scrambling code based on the time matching information of the scrambling code, thereby generating an encoded data.

In accordance with still further another aspect of the present invention, there is provided a computer readable recording medium in a base station having a processor, which stores instructions for executing a method for assigning a code in a reverse channel of a synchronous wireless telecommunication system, comprising the steps of: a) at a base station, transmitting time matching information of a scrambling code to a mobile station; b) at a base station, receiving an encoded data which is scrambled based on the time matching information from the mobile station; and c) decoding the encoded data by despreading and descrambling the encoded data.

BRIEF DESCRIPTION OF THE DRAWINGS

Other objects and aspects of the invention will become apparent from the following description of the embodiments with reference to the accompanying drawings, in which.

PREFERRED EMBODIMENTS OF THE INVENTION

Uplink synchronous transmission scheme (USTS) technology will be described in more detail.

When a mobile station located in a coverage (cell) of a base station tries to set up a call through a reverse channel, a node B (base transceiver station) of the base station sets a reference time based on a round trip propagation delay and computes time offset between the reference time and start time of frame of the mobile station trying to set up the call. When the mobile station receives a signal from the base station, also, the base station computes time offset between the reference time and start time of frame of the mobile station. The base station informs the mobile station of the time offset through a control information channel. The mobile station adjusts start time of its frame in a transmission channel to the reference time of the base station.

Another mobile station adjusts start time of its frame based on the time offset received from the base station. The time offset is necessary for the mobile station to generate a scrambling code to be multiplied by transmission data. Each scrambling code is assigned to a base station, and all the mobile stations in the coverage of the base station use the same scrambling code. The scrambling code is multiplied by the transmission data in order to identify the base station to which the transmission data is transmitted.

All the mobile stations within the coverage of the same base station have the same reference time, such that the orthogonal code can be used.

The orthogonal code has a faster chip rate than that of the transmission data. A bandwidth of the transmission data is increased to 1/chip rate by being multiplied by the orthogonal code. The orthogonal code is referred to as "a spreading code". In the forward channel, the orthogonal code is also referred to as "a channelization code". Since the orthogonal code has a high correlation between the same codes, the orthogonal code is accurately decoded. However, the orthogonal code has zero (0) correlation with the other codes. Therefore, the orthogonal code can make the correlation between the channels zero (0). In other words, the correlation between one channel and another channel spread by a different orthogonal codes is zero (0).

There are multiple channels from the mobile station to the base station. Each of the multiple channels is multiplied by a different orthogonal code in order to identify the channel and then multiplied by the same scrambling code in order to synchronize the multiple channels.

As mentioned above, one scrambling code is assigned to all of the mobile stations within the same cell, and the channels of the mobile stations are synchronized, thereby being capable of using the orthogonal characteristics between the channels.

Hereinafter, embodiments of the present invention will be described in detail referring to the accompanying drawings.

Figure 1:
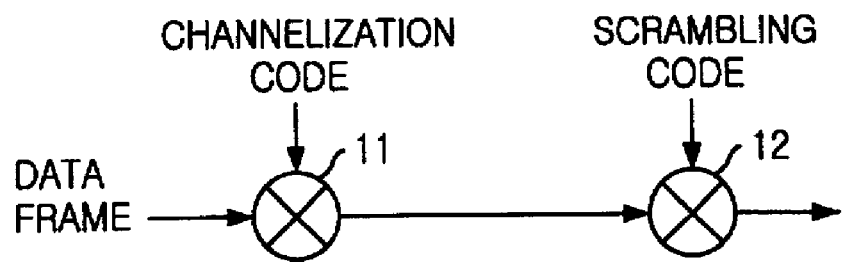
FIG. 1 is a block diagram of an encoder applied to the present invention.

FIG. 1 is a block diagram of an encoder applied to the present invention.

Referring to FIG. 1, a signal to be transmitted is spread by being multiplied by an orthogonal code (spreading code) in a first multiplier 11, to thereby generate a spread signal. The spread signal is scrambled by being multiplied by the scrambling code in a second multiplier 12.

When decoding a received signal, the received signal is descrambled and then despread, such that an original signal is obtained.

Figure 2:
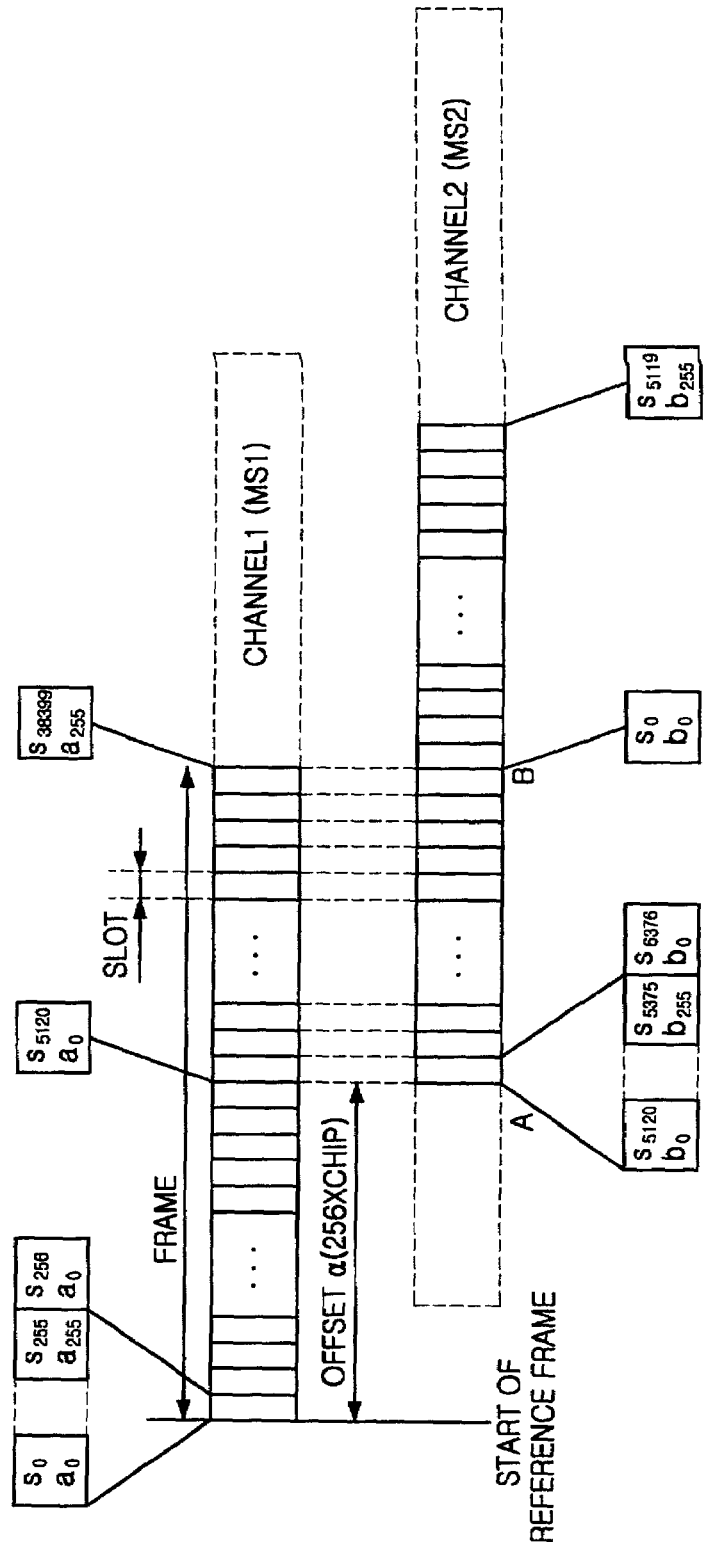
FIG. 2 is a diagram for illustrating data formats of an orthogonal code and a scrambling code in which there are two mobile stations, and for showing a method of matching timing of codes in a node B in accordance with the present invention.

FIG. 2 is a diagram for illustrating data formats of an orthogonal code and a scrambling code in which there are two mobile stations, and for showing a method of matching timing of codes in a node B.

The reference numeral "a" and "b" denote orthogonal codes, "s" a scrambling code. A spreading factor is 256.

Referring to FIG. 2, data frame in each of mobile stations within a cell has a different start time, because each of the mobile stations independently tries to set up a call. The base station informs each mobile station of the time offset from the reference time, such that each of the mobile stations can have the same reference time. The scrambling code which is multiplied to the multiple channels at the same time has the same number of chip.

When a first mobile station tries to set up a call, from front of the first frame to end of the last frame of a first channel of the first mobile station are multiplied by chips $S_0$ to $S_{38390}$ of a scrambling code. When a second mobile station tries to set up a call during communication between the first mobile station and the base station, from front of the first frame to end of the last frame of a second channel are multiplied by chips $S_{5120}$ to $S_{38390}$ and $S_0$ to $S_{5119}$ of the scrambling code.

The second channel is delayed from the first channel by the time offset _ (256×n chip), however, the scrambling code multiplied by the data frame in the second channel at time A is $S_{5120}$ which is the same as the first channel. At time B, one frame of the first channel is end and the frame of the second channel is not end, however, the scrambling code of the second channel is newly started as the same as that of the first channel.

Therefore, the data frame in the channel for each of the mobile stations is multiplied by the same scrambling code at the same time. The decoder of the base station can entirely obtain the data from the mobile stations by descrambling the received signals which are synchronized and can reduce interference between the channels by despreading the descrambled signals.

Here, the scrambling code and the frame has the same length, 38400 chips, and the scrambling code is multiplied by one frame. A slot has a length of 2560 chips, the orthogonal code is repeatedly multiplied by 256-chip (1/10 slot) of the data frame.

Figure 3:
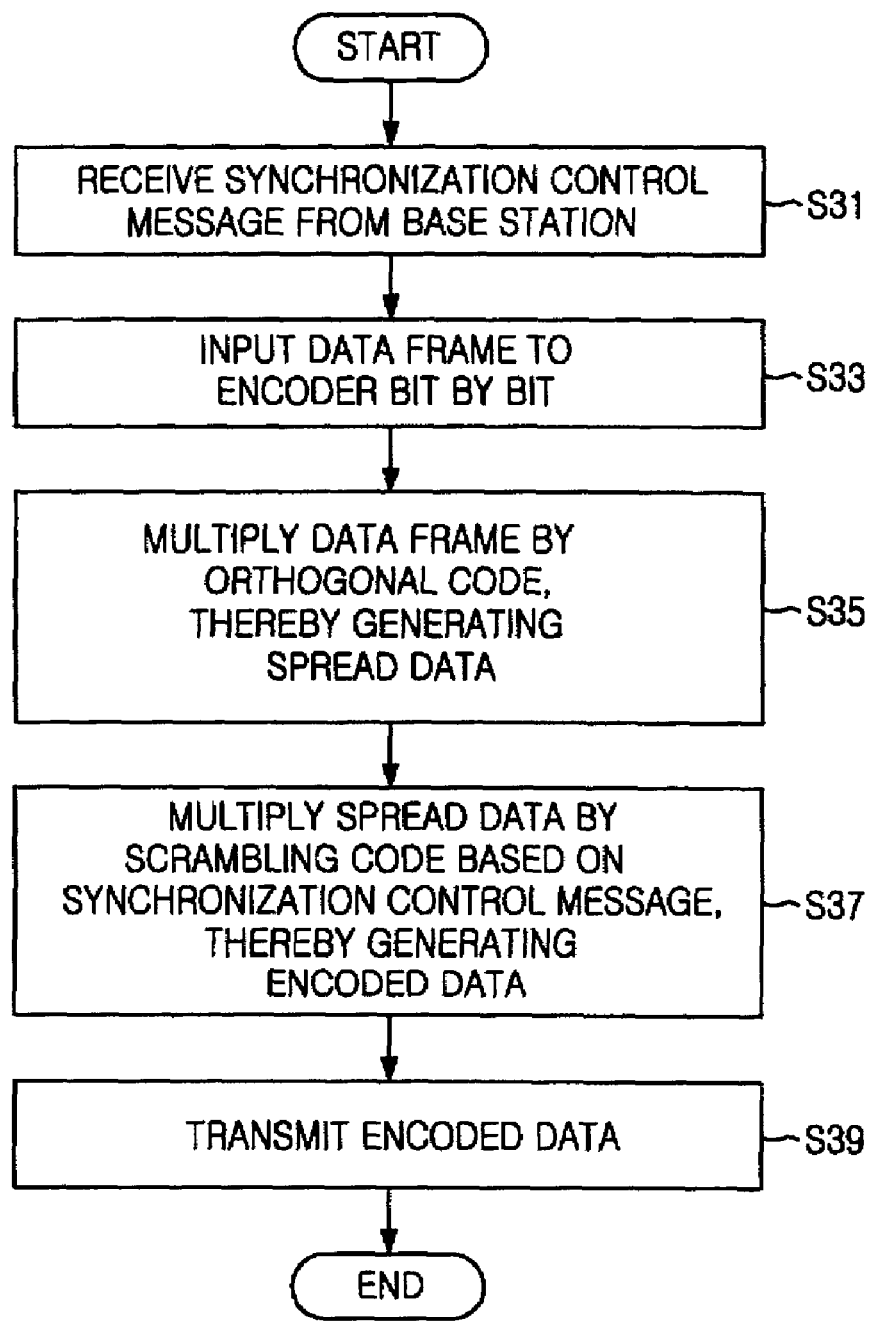
FIG. 3 is a flow chart of a code assigning method in an uplink of a synchronous wireless telecommunication system in accordance with the present invention.

FIG. 3 is a flow chart of a code assigning method in an uplink of a synchronous wireless telecommunication system in accordance with the present invention.

A mobile station receives a synchronization control message from a base station at step S31. The synchronization control message includes time matching information that m_th slot of the spread data should be multiplied by n_th chip of the scrambling code. Here, m and n are integer numbers lager than 0.

Data frames to be transmitted are inputted to an encoder bit by bit at step S33.

In the mobile station, one data frame, 150 bits, is divided into 15 slots, and one slot is multiplied by a 256-chip orthogonal code, thereby spreading a bit into 256 chips at step S35. One frame is spread into 38400 chips.

The spread data is multiplied by the scrambling code based on the time matching information of the synchronization control message, thereby generating an encoded data at step S37. In other words, the spread data is multiplied by the scrambling code corresponding to the start slot of the frame based on the synchronization control message. By multiplying the same scrambling code to the channels of all mobile stations in the same cell at the same time, the decoder of the base station can perform accurate descrambling of the received signals from the mobile stations.

The encoded data is transmitted to the base station at step S39.

Using the code assigning method according to the present invention, the uplink synchronous transmission scheme is implemented, and the interference between the reverse channels can be minimized, to thereby increase capacity of the base station. By synchronizing the channels, orthogonality between the channels can be effectively used, thereby increasing quality of the communication.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for assigning codes in a reverse channel of a synchronous wireless telecommunication system, comprising the steps of:
   a) at a mobile station, receiving time matching information of a scrambling code from a base station;
   b) at the mobile station, spreading data frame to be transmitted by an orthogonal code, thereby generating a spread data; and c) at the mobile station, multiplying the spread data by a scrambling code based on the time matching information of the scrambling code, thereby generating an encoded data, wherein the time matching information of the scrambling code includes information indicating that m_th slot of the spread data should be multiplied by n_th chip of the scrambling code (here, m and n are integer numbers).

2. The method as recited in claim 1, wherein the time matching information of the scrambling code is transmitted from the base station to the mobile station through a synchronization control message.

3. A method for assigning a code in a reverse channel of a synchronous wireless telecommunication system, comprising the steps of:
   a) at a base station, transmitting time matching information of a scrambling code to a mobile station;
   b) at the base station, receiving an encoded data which is scrambled based on the time matching information from the mobile station; and
   c) at the base station, decoding the encoded data by despreading and descrambling the encoded data, wherein the time matching information of the scrambling code includes information indicating that m_th slot of the spread data should be multiplied by n_th chip of the scrambling code (here, m and n are integer numbers).

4. The method as recited in claim 3, wherein the time matching information of the scrambling code is transmitted from the base station to the mobile station through a synchronization control message.

5. A computer readable recording medium in a mobile station having a processor, which stores instructions for executing a method for assigning a code in a reverse channel of a synchronous wireless telecommunication system, the method comprising the steps of:
   a) at a mobile station, receiving time matching information of a scrambling code from a base station;
   b) at the mobile station, spreading data frame to be transmitted by an orthogonal code, thereby generating a spread data; and
   c) at the mobile station, multiplying the spread data by a scrambling code based on the time matching information of the scrambling code, thereby generating an encoded data, wherein the time matching information of the scrambling code includes information indicating that m_th slot of the spread data should be multiplied by n_th chip of the scrambling code (here, m and n are integer numbers).

6. A computer readable recording medium in a base station having a processor, which stores instructions for executing a method for assigning a code in a reverse channel of a synchronous wireless telecommunication system, comprising the steps of:
   a) at a base station, transmitting time matching information of a scrambling code to a mobile station;
   b) at the base station, receiving an encoded data which is scrambled based on the time matching information from the mobile station; and
   c) at the base station, decoding the encoded data by despreading and descrambling the encoded data, wherein the time matching information of the scrambling code includes information indicating that m_th slot of the spread data should be multiplied by n_th chip of the scrambling code (here, m and n are integer numbers).

* * * * *